(12) United States Patent
Härtel et al.

(10) Patent No.: US 6,337,749 B1
(45) Date of Patent: *Jan. 8, 2002

(54) METHOD FOR GENERATING A CONTROL SIGNAL FOR APPARATUS PRODUCING TOPOLOGICAL DEPTHS ON A WORKPIECE

(75) Inventors: Volker Härtel, Germering; Dieter Blind, Donzdorf/Winzingen; Rudolf Werner, Göppingen; Uwe Müssigmann, Sindelfingen, all of (DE)

(73) Assignee: Benecke-Kaliko AG, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/852,748

(22) Filed: May 6, 1997

(30) Foreign Application Priority Data

May 8, 1996 (DE) .......................... 196 18 367

(51) Int. Cl.⁷ ................................. H04N 1/21
(52) U.S. Cl. .................. 358/297; 219/121.69
(58) Field of Search .............. 219/121.6, 121.61, 219/121.68, 121.69; 264/400; 358/297, 299; 700/163

(56) References Cited

U.S. PATENT DOCUMENTS

| | | |
|---|---|---|
| 3,396,401 A | 8/1968 | Nonomura |
| 3,632,305 A | 1/1972 | Marcy |
| 3,663,793 A | 5/1972 | Petro et al. |
| 3,739,038 A | 6/1973 | Landsman |
| 4,010,320 A | 3/1977 | Kudlich |
| 4,087,672 A * | 5/1978 | Yi .................. 219/121.69 |

(List continued on next page.)

FOREIGN PATENT DOCUMENTS

| | | | |
|---|---|---|---|
| DE | 3613013 | 10/1987 | |
| DE | 3834788 A1 | 4/1990 | |
| DE | 40 39 132 A1 | 6/1991 | |
| DE | 4133620 C1 | 10/1991 | ........... B23K/26/00 |
| DE | 40 41 105 A1 | 6/1992 | |
| DE | 42 13 106 A1 | 11/1992 | |
| DE | 4324970 C2 | 7/1993 | ........... B29C/59/02 |
| JP | 58-151983 | 9/1983 | |
| JP | 1-95885 | 4/1989 | |
| JP | P5-32100 | 2/1993 | |
| WO | 94/02280 | * 2/1994 | |
| WO | 95/04626 | * 2/1995 | |

OTHER PUBLICATIONS

Japanese Abstract in English of "Working Method on Outer Peripheral Face of Annular or Tubular Article", dated Jul. 10, 1986, vol. 10/No. 196.

"Erweiterungsmöglichkeiten einer CNC–Steuerung für die 5–Achsen–Fräsbearbeitung", Prof. Dr.–Ing. Drs. h.c.G. Spur Dr.–Ing. A. Potthast und Dipl.–Ing. L. Wojcik, Berlin, 1989.

Erweiterungsmöglichkeiten einer CNC–Steuerung für die 5–Achsen–Fräsbearbeitung (English Summary).

* cited by examiner

Primary Examiner—Jon Chang
Assistant Examiner—Jingge Wu
(74) Attorney, Agent, or Firm—Shlesinger, Arkwright & Garvey LLP

(57) ABSTRACT

A method for generating an electric control signal driving apparatus to produce a topological structure on a workpiece, in particular to produce a leather structure. Initially, at least, two different signal components are generated and the control signal is then formed by their addition. One signal component may correspond to a fine structure and another for instance to a coarse structure or to a line structure. In this manner, the portions of the structure can be determined and processed one at a time to imitate a natural leather surface.

18 Claims, 6 Drawing Sheets

U.S. PATENT DOCUMENTS

| | | |
|---|---|---|
| 4,156,124 A | 5/1979 | Macken et al. |
| 4,422,101 A | 12/1983 | Takei |
| 4,500,929 A | 2/1985 | Buechler |
| 4,629,858 A | 12/1986 | Kyle |
| 4,734,558 A | 3/1988 | Nakano et al. |
| 4,744,936 A | 5/1988 | Bittner, Jr. |
| 4,758,705 A * | 7/1988 | Hertzei et al. ........... 219/121.6 |
| 4,843,207 A | 6/1989 | Urbanek et al. |
| 4,859,828 A | 8/1989 | Zumstein |
| 4,947,022 A | 8/1990 | Ostroff et al. |
| 4,977,512 A | 12/1990 | Nakagawa |
| 5,003,153 A | 3/1991 | Kondo |
| 5,041,716 A | 8/1991 | Wakabayashi |
| 5,269,983 A | 12/1993 | Schulz |
| 5,338,915 A * | 8/1994 | Hildebrand et al. ... 219/121.69 |
| 5,379,059 A * | 1/1995 | Winsor ...................... 346/108 |
| 5,759,473 A * | 6/1998 | Minke et al. .......... 219/121.69 |
| 5,886,317 A * | 3/1999 | Hinrichs et al. ............ 358/297 |

METHOD FOR GENERATING A CONTROL SIGNAL FOR APPARATUS PRODUCING TOPOLOGICAL DEPTHS ON A WORKPIECE

BACKGROUND OF THE INVENTION

German patent document 43 24 970 C2 describes how to create a depth structure in the surface of a silicone-rubber embossing roller. First, an endless positive mold is made from the surface of a pattern. A layer of silicone rubber is then poured or painted on the positive mold. The layer is then vulcanized into an embossing daughter that is removed from the positive mold and bonded to the circumferential surface of the embossing roller with its negative embossing surface facing outward. To produce the endless positive mold, the surface of the pattern is mechanically or optically scanned and the optical information so obtained is converted into a corresponding electrical information, namely a control signal. A layer of material having a surface that permits it to be engraved by an incident laser is mounted on the circumference of a roller. A laser beam is directed onto the surface of the material on the roller. The laser beam and the roller surface are displaced relative to each other and the intensity of the laser beam is modulated as a function of the control signal so that the pattern is engraved by the laser beam into the surface of the roller material. While the engraving faithfulness is very high, a drawback is that the engraved pattern depends upon the original pattern. While it is possible to engrave several embossing rollers using the same control signal, in the prior art the same engraved pattern can be produced only in relation to the original pattern.

German patent document 41 33 620 C1 discloses a method of the pertinent species wherein the apparatus producing a topological depth structure in a workpiece generates a Laser beam guided by a control signal driving a control unit along a dot-determined groove line on the workpiece surface being processed. To determine the groove line, the coordinates of path-curves are first ascertained and then the coordinates or nominal points sub-dividing the path-curves in discrete path segments are ascertained. Thereupon an elliptical or circular surface associated with each nominal point is determined. The groove points contained in the surface are selected arbitrarily. In the end, a control signal is used causing the processing laser beam to move along the groove line in such manner that a corresponding line is produced in the workpiece surface. By appropriately selecting the size of the segments and/or the size of the elliptical or circular surfaces and by many repetitions of these procedures, optionally in different directions, a large number of different and possibly mutually incident lines is generated on the workpiece surface and as a result, a surface structure with approximately uniform roughness is obtained. Even though the control signal of this known method is variable in the sense that the groove lines and thereby the processing lines run in different ways and upon manifold repetition of the processing a plurality of substantial recesses are produced at the crossings of the groove lines, that is are produced at different sites, the appearance of such a surface nevertheless will be uniform and hence monotonous.

OBJECTS AND SUMMARY OF THE INVENTION

The object of the present invention is to create a method for generating an electric control signal driving apparatus to produce topological depths on a workpiece by means of which a control signal generating substantially monotonous surface structures can be generated independently of an original pattern.

The basic concept of the present disclosure is to artificially synthesize the control signal driving the apparatus producing a depth-structure, i.e. a topological structure, from at least two signal components of which the amplitudes and time functions can be selected separately and which may then be additively superposed. In other words, basic and different traits of the topological depth structure can be taken into account when generating each signal component, unlike the case of summarily forming only a single control signal.

Illustratively in an appropriate implementation of the method of the present invention, one signal component may be formed to correspond to a fine structure and another signal component may be formed to correspond to a coarse signal of the desired topological structure. If for instance the desired topological structure is an imitation leather surface, the fine structure can correspond to the pores and the coarse structure to the grain of the surface of natural leather. In addition, a further signal component may be formed for a striated structure. In order to impart some roughness to the surface, it is possible to constitute a signal component in the form of a noise signal. The addition of all these signals results in a control signal to drive a surface processing apparatus, for instance a milling machine, or which may drive the intensity or the speed of displacement of a laser beam in order to create in this manner the topological depth structure of the workpiece.

In a further implementation of the invention the relative amplitudes of the signal components may be varied. Illustratively the pore size may be changed relative to the grain size when generating a control signal to form a topology corresponding to a leather surface and to achieve in this manner various leather imitations.

In a further development of the invention the making of the fine and/or coarse structure is based on a cell structure for which the area being processed is divided into a pattern of surface segments herein called cells which may differ from one another more or less in their absolute and relative sizes and with respect to their boundary lines.

In a further implementation of the invention, cell nuclei are determined arbitrarily or at random with respect to location and mutual spacing and on that basis cell boundaries are determined for the purpose of defining the positions of the individual cells in the cell structure in the direction of the area of the workpiece being processed. The cell boundaries may be formed in a number of ways. One appropriate way is to form the cell boundaries as center-perpendiculars to conceptual lines connecting adjoining cell nuclei. This approach already leads to natural cell patterns, however the boundary lines of the cells are always straight and hence the cells are polygons. In some circumstances this geometry is immediately recognized by the naked eye and thus constitutes a drawback if imitation of pores and/or grain of natural leather is desired.

Accordingly, it is especially appropriate to form the cell boundaries so that they be irregularly and preferably randomly increasing farther away from the cell nuclei. At least two iteration stages may be preset and thereby cell structures of different sizes may be superposed.

Because cells so made only represent areas on the surface of the workpiece being processed, formation of a topological structure requires associating freely or randomly selected height signals which when combined will form the signal components.

In an appropriate implementation of the invention, one of the signal components is formed to correspond to a linear structure composed of linear segments abutting at angles selected in specified or random manner. Because this signal component obviously also is depth signal, recesses shaped like grooves are produced by this signal component in the workpiece surface, where the grooves may corresponds for instance to the folds of natural leather. Appropriately the cross-sectional contours of the particular line segments are predetermined individually or as whole and/or are selected at random from a list of predetermined cross-sectional contours. In this manner small or large folds of natural leather may be imitated.

Lastly and as regards an appropriate implementation of the present invention, a signal component may be formed to correspond to a dot structure. As a result, it is possible for instance to imitate the hair pores of a natural leather surface. In this case as well, the sites and mutual spacings of the points are appropriately selected freely or randomly and advantageously signal elements of a signal component corresponding to each point of the dot structure will be formed corresponding to a bell curve.

BRIEF DESCRIPTION OF THE DRAWINGS

The invention is elucidated below in relation to the drawings.

DETAILED DESCRIPTION OF THE PREFERRED EMBODIMENTS

Figure 1:
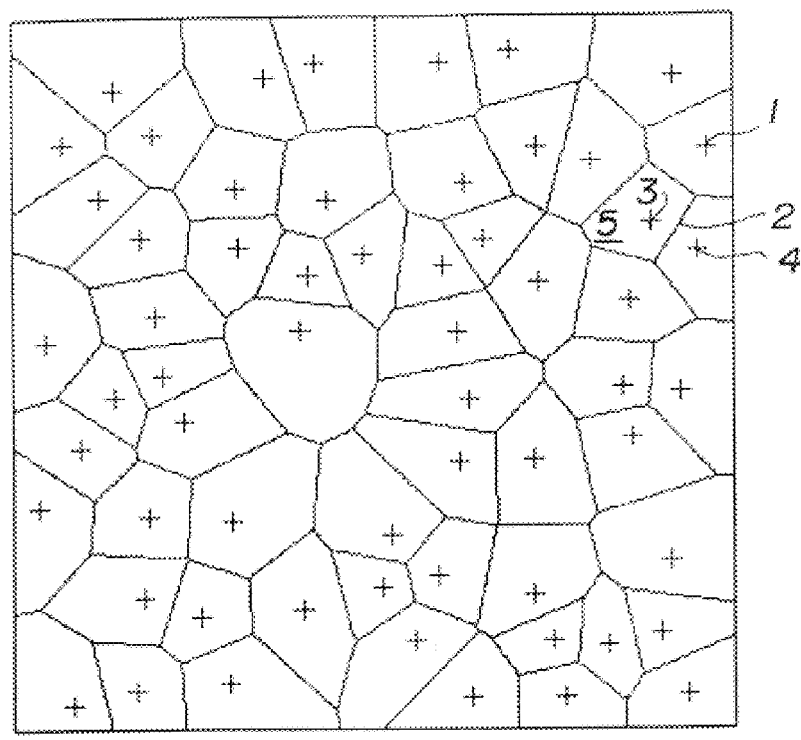
FIG. 1 illustrates the positions of the cell nuclei and their boundaries.
Figure 2A:
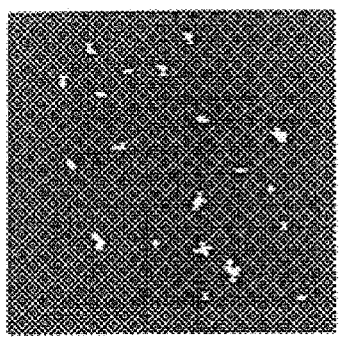
FIGS. 2A–2F illustrate the process of randomly increasing cells.
Figure 2B:
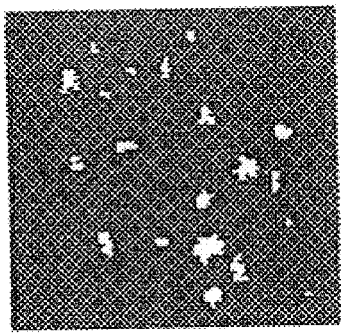
Figure 2C:
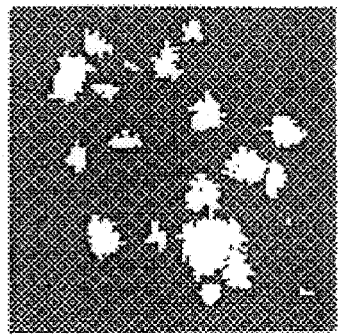
Figure 2D:
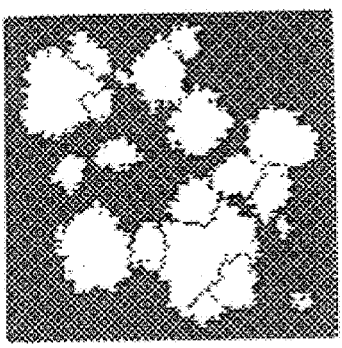
Figure 2E:
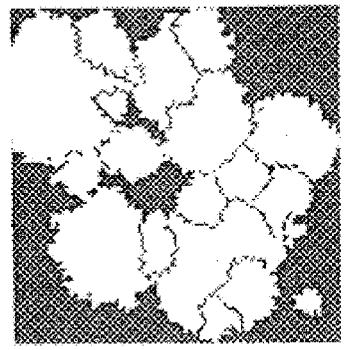
Figure 2F:
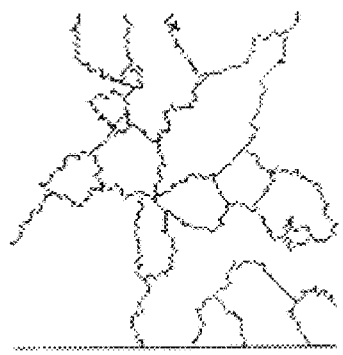

FIG. 1 schematically shows an arbitrarily selected area of a surface corresponding to the workpiece surface to be processed. The method used consists in first determining randomly distributed cell nuclei 1 of definite minimum and maximum spacings for the purpose of making a fine and/or coarse structure. Next, cell boundaries 2 constituting center-perpendiculars to conceptual lines connecting adjoining cells 3 and 4 are formed and as a result cells 5 with polygonal boundaries are made into polygons.

Because the cell boundaries so achieved evince a polygonal and hence relatively uniform and monotonous appearance, one implementation of the invention shown in FIG. 2 produces a cell structure by means of cell boundaries irregularly increasing in different directions and at different rates. FIG. 2a shows that initially, there are only a few small cells which grow in different directions irregularly and at different rates, and accordingly, the cells grow irregularly as shown sequentially in FIGS. 2B through 2F. The arbitrarily selected area shown in FIGS. 2A through 2F is very small. The real area obviously is substantially larger and accordingly more cells also are formed. As a result, a cell structure is achieved of which the appearance is shown clearly in shadowed form in FIG. 3.

Cell growth as elucidated in FIG. 2 also can be applied iteratively in sequence. In this manner, finer cell structures may be achieved in large-size cells as shown in shadow form in FIG. 4. It speaks for itself that structuring can be controlled by presetting the number of iterative steps, as a result of which cell structures of different sizes will be superposed.

Figure 5:
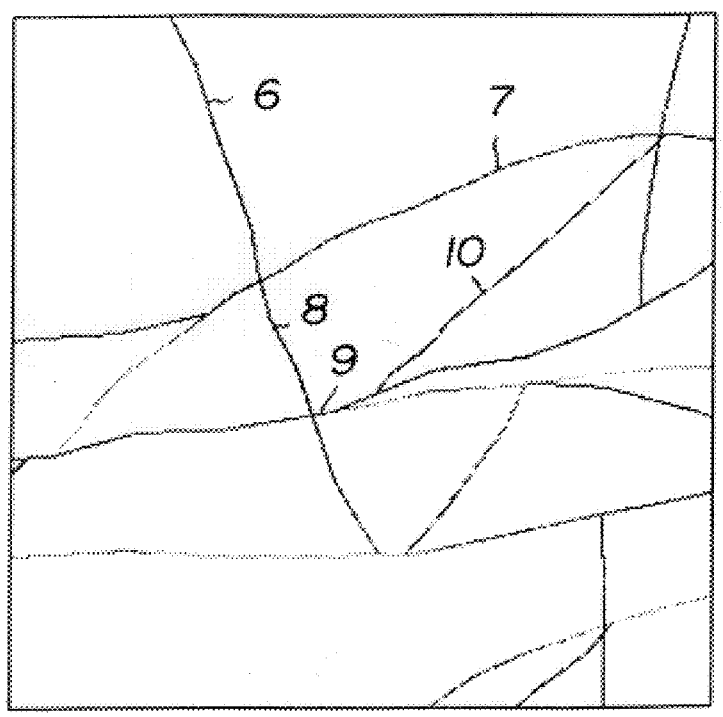
FIG. 5 shows a line structure.

FIG. 5 shows an illustrative implementation of the method of the invention for producing a structure with lines 6 for the purpose of imitating the folds of a natural leather surface. FIG. 5 shows that the line structure is formed from line segments such as 7, 8, 9 and 10 which are mutually incident at randomly selected angles.

Figure 6:
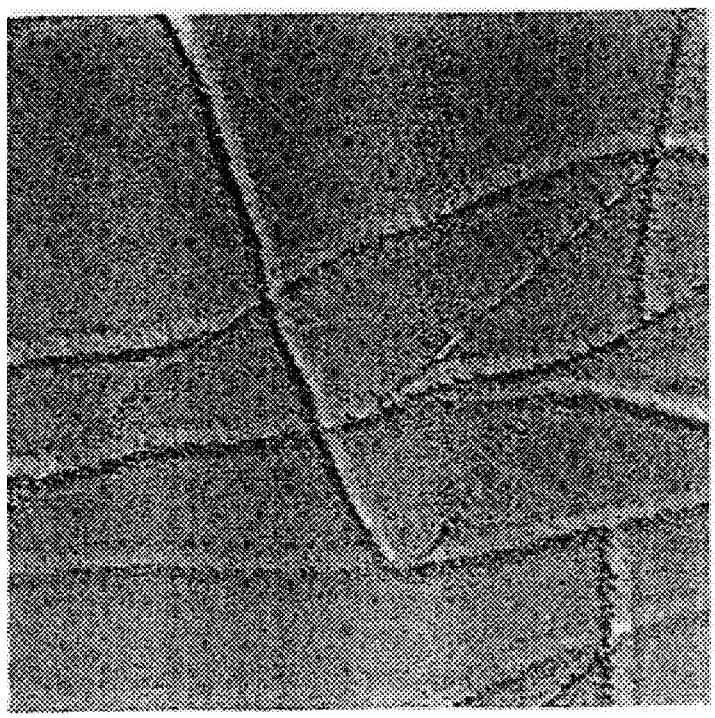
FIG. 6 shows a shadowed groove/fold structure based on the line structure of FIG. 5.

Based on the line structure of FIG. 5, a particular cross-sectional contour emphasized in shadow representation in FIG. 6 is associated by the corresponding electrical signal to the individual line segments such as 7, 8, 9 and 10.

Figure 4:
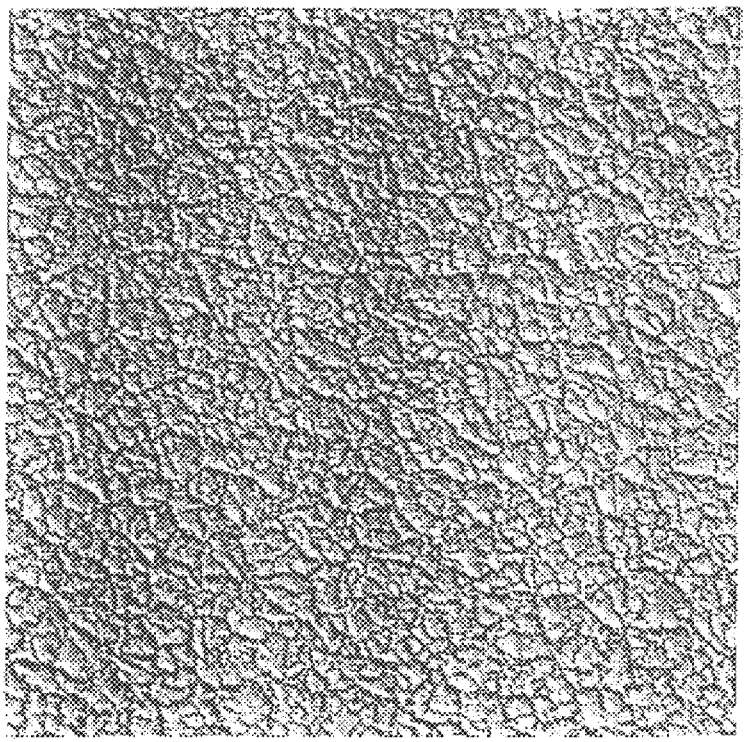
FIG. 4 shows a shadowed multiple cell structure.
Figure 7:
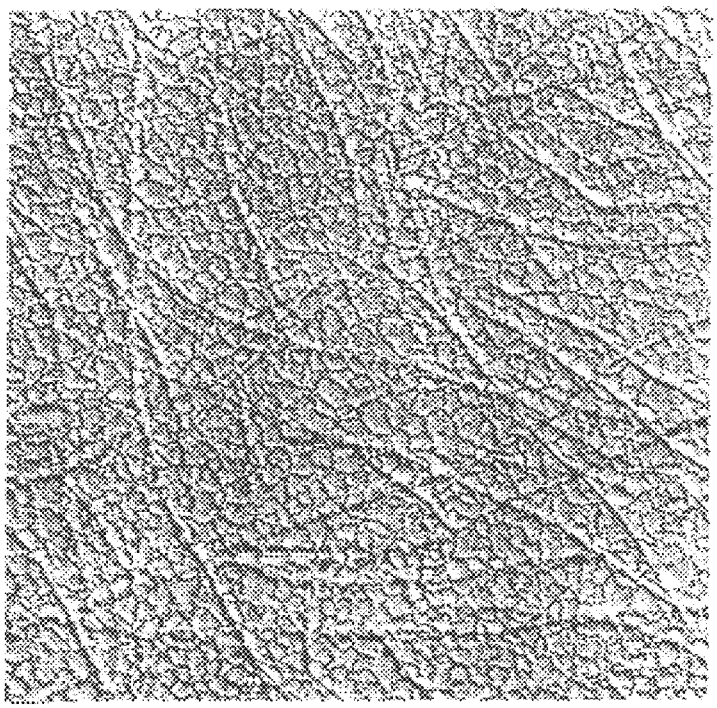
FIG. 7 illustrates a topology obtained when superposing the structures of FIGS. 4 and 6.

FIG. 7 is a shadow representation of a topology imitating the depth structure of a natural leather surface and produced by the superposition of the electrical signal components corresponding to the structures of FIGS. 4 and 6. It is clear that this topology already very closely resembles a natural leather surface.

Figure 8:
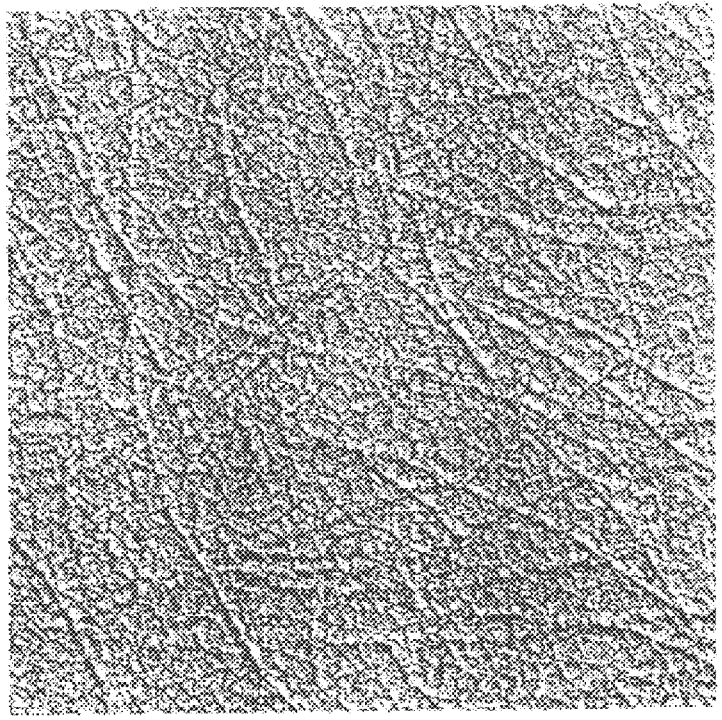
FIG. 8 shows the structure of FIG. 7 with superposed roughened structure.

FIG. 8 shows the topology of FIG. 7, however a further signal, namely a noise signal, has been added to the signal components for the particular structures. As a result, some roughness has been imparted to the surface structure and FIG. 8 is one step closer to a natural leather surface.

Figure 9:
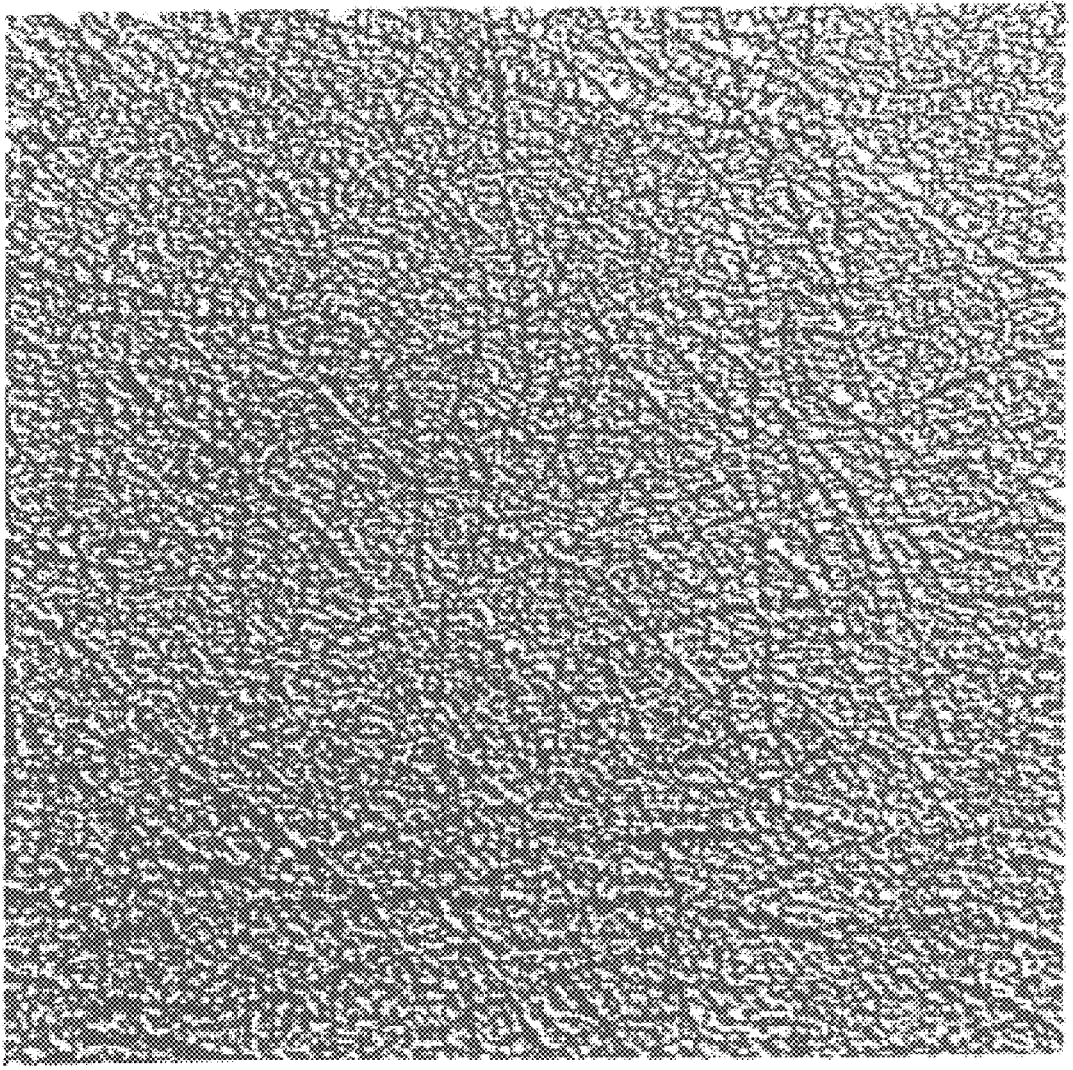
FIG. 9 corresponds to FIG. 8 and additionally shows a superposed dot structure.

Lastly FIG. 9, which is also shown with shadows, represents the surface structure of FIG. 8, a further signal component corresponding to a dot structure having been superposed and as a result, this dot structure imitates the hair pores of a natural leather surface.

In FIGS. 1 through 9, FIGS. 1 and 2 geometrically show the formation of cell structures in one plane, the cell structures being superposed on height structures, resulting in a signal component driving apparatus for producing a depth structure in a workpiece surface. Illustratively, the control action may be line-wise, with the tool, laser beam or milling head being guided line-wise over the workpiece surface being processed.

Figure 3:
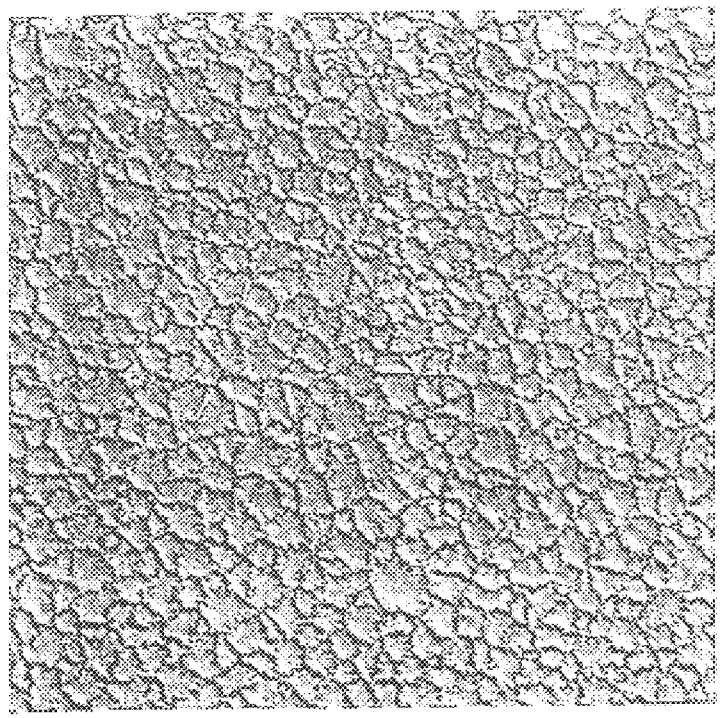
FIG. 3 shows a shadowed single cell structure.

FIGS. 3 and 4 elucidate the production of different cell structures to which again are associated corresponding control signal-components.

FIGS. 5 and 6 elucidate the generation of a signal component corresponding to a line or fold structure. A signal component corresponding to a noise signal is not shown, but the nature of such a signal is obvious to the expert.

Figure 10:
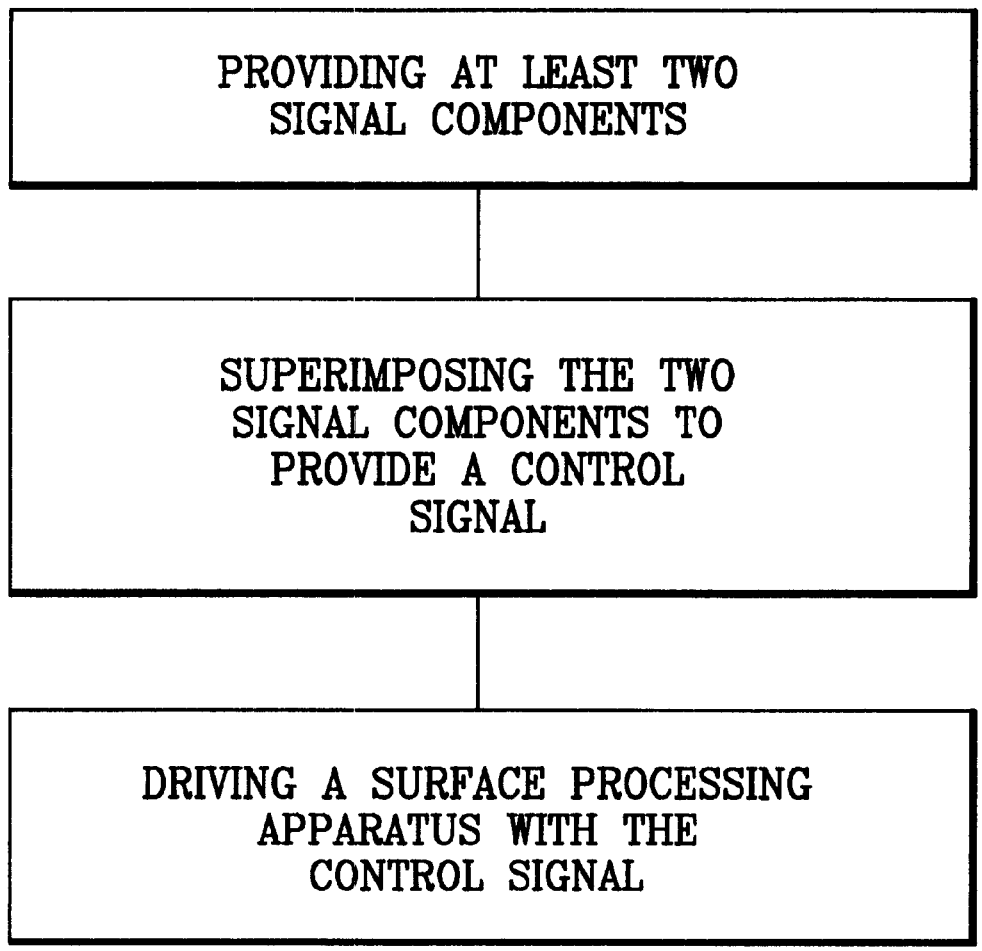
FIG. 10 is a flowchart showing a method for generating a control signal for driving an apparatus for producing topological depths on a workpiece in accordance with the present invention.

By superposing the signal components a resulting control signal is obtained to drive the apparatus producing a depth structure, as best shown in FIG. 10. It is critical that the individual structures and hence the corresponding signal components that will constitute the final control signal can be generated individually and thereby also can be shaped and processed independently of other signal components. This is impossible in the case of one signal only. As a result the matching to the desired topology becomes feasible.

What is claimed is:

1. A method for generating a synthesized control signal for driving an apparatus for producing topological depths on a workpiece, in particular to produce a leather structure, comprising:

a) providing at least first and second control signals corresponding respectively to first and second structures of a desired topological structure; and b) adding said at least first and second control signals to form the synthesized control signal to drive the apparatus.

2. A method for generating a synthesized control signal for driving an apparatus for producing topological depths on a workpiece, in particular to produce leather structure, comprising:

a) providing first, second, third and fourth control signals corresponding respectively to a fine structure, a coarse structure, a striated structure and a roughness structure of a desired topological structure; and b) adding said first, second, third and fourth control signals to generate the synthesized control signal to drive the apparatus.

3. Method as claimed in claim 1, wherein said at least first control signal is formed to correspond to a fine structure and said at least second control signal is formed to correspond to a coarse structure of the desired topological structure.

4. Method as claimed in claim 1, wherein one of said at least first and second control signals is formed to correspond to a fold structure.

5. Method as claimed in claim 1, wherein one of said at least first and second control signals is formed as a noise signal.

6. Method as claimed in claim 1, wherein said at least first and second control signals are varied in their relative amplitudes.

7. Method as claimed in claim 3, wherein said fine and coarse structures assume the form of a cell structure.

8. Method as claimed in claim 7, wherein said at least first and second control signals include height signals associated to each cell in the cell structure.

9. Method as claimed in claim 7, wherein said cell structure includes cell nuclei initially determined with arbitrary or random sites and mutual spacings.

10. Method as claimed in claim 9, wherein cell boundaries are central perpendiculars to conceptual lines connecting adjoining cell nuclei.

11. Method as claimed in claim 10, wherein the cell boundaries grow irregularly starting from the cell nuclei.

12. Method as claimed in claim 10, wherein at least two iteration stages are preset to form the cells and thereby cell structures of different sizes are superposed.

13. Method as claimed in claim 3, wherein said at least first and second control signals include a signal component formed to correspond to a line structure consisting of line segments incident on one another.

14. Method as claimed in claim 13, wherein individual line segments of the line structure have cross-sectional contours.

15. Method as claimed in claim 3, wherein said at least first and second control signals include a signal component formed to correspond to a dot structure including dots.

16. Method as claimed in claim 15, wherein the sites and mutual spacings of the dots are selected freely or at random.

17. Method as claimed in claim 16, wherein signal elements of the signal component each corresponding to one dot of the dot structure are formed to correspond to a bell curve.

18. A method for generating a synthesized control signal for driving an apparatus for producing topological depths on a workpiece, in particular to produce leather structure, comprising:

a) providing first, second, third and fourth control signals corresponding respectively to a cell structure, a fold structure, a roughened structure and a dot structure of a desired topological structure; and b) adding said first, second, third and fourth control signals to generate the synthesized control signal to drive the apparatus.

* * * * *